United States Patent
Kaida

(10) Patent No.: US 7,145,610 B2
(45) Date of Patent: Dec. 5, 2006

(54) RECEIVING METHOD AND APPARATUS OF ANALOG TELEVISION SIGNALS TECHNICAL FIELD

(75) Inventor: Takayuki Kaida, Tokyo (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 10/343,265

(22) PCT Filed: May 29, 2002

(86) PCT No.: PCT/JP02/05233

§ 371 (c)(1),
(2), (4) Date: Dec. 23, 2003

(87) PCT Pub. No.: WO02/102070

PCT Pub. Date: Dec. 19, 2002

(65) Prior Publication Data

US 2004/0130665 A1    Jul. 8, 2004

(30) Foreign Application Priority Data

May 29, 2001 (JP) .............................. 2001-161011

(51) Int. Cl.
*H04N 5/44* (2006.01)
(52) U.S. Cl. ...................... 348/725; 348/726; 348/738
(58) Field of Classification Search ........ 348/735–738, 348/725, 726, 731
See application file for complete search history.

(56) References Cited

U.S. PATENT DOCUMENTS 4,479,091 A  * 10/1984  Yoshisato .................... 329/326

(Continued)

FOREIGN PATENT DOCUMENTS

JP    2-166810    6/1990

(Continued)

OTHER PUBLICATIONS

Patent Abstracts of Japan, vol. 0175, No. 45 (E-1442), Sep. 30, 1993 & JP 05 153523 A (Toshiba Corp), Jun. 18, 1993.

*Primary Examiner*—Michael H. Lee
(74) *Attorney, Agent, or Firm*—Frommer Lawrence & Haug LLP; William S. Frommer

(57) ABSTRACT

Receiving method and apparatus of analog television signals where analog television signals receiving is performed by digital processing are proposed.

A high frequency signal supplied to an input terminal 1 is supplied to a mixer circuit 2 and mixed with a local oscillation signal from a local oscillator circuit 3. The intermediate frequency signal from the mixer circuit 2 is supplied to an A/D converter circuit 4. Thereafter the digital converted signal is supplied to a video carrier wave reproducer circuit 5 and a video demodulator circuit 6 by digital processing, and a demodulated video signal is derived at an output terminal 7. At the same time the digital signal from the A/D converter circuit 4 is supplied to a phase comparator circuit 11 and phase compared with an oscillation signal from a variable frequency oscillator (VCO) 12 and further the phase compared output is supplied to the VCO 12. The phase compared output of the phase comparator 11 is additionally supplied to an adder 13 and the video carrier wave component from the video carrier wave reproducer circuit 5 is subtracted. The subtracted output is then supplied to a low pass filter 14 and a demodulated sound signal is derived at an output terminal 15.

In this way an analog television signals receiving can be performed by digital processing and can be made common within a digital television receiving means.

4 Claims, 1 Drawing Sheet

U.S. PATENT DOCUMENTS

| | | | |
|---|---|---|---|
| 4,551,756 A * | 11/1985 | Ogawa et al. | 348/737 |
| 5,018,016 A * | 5/1991 | Imaizumi | 348/738 |
| 5,570,137 A | 10/1996 | Goeckler | |
| 5,737,035 A | 4/1998 | Rotzoll | |
| 6,005,640 A | 12/1999 | Strolle et al. | |
| 6,147,713 A | 11/2000 | Robbins et al. | |
| 6,177,964 B1 | 1/2001 | Birleson et al. | |

FOREIGN PATENT DOCUMENTS

| | | |
|---|---|---|
| JP | 5-153523 | 6/1993 |
| WO | WO 01 24358 | 4/2001 |
| WO | WO 01 28255 | 4/2001 |

* cited by examiner

RECEIVING METHOD AND APPARATUS OF ANALOG TELEVISION SIGNALS

TECHNICAL FIELD

The present invention relates to receiving method and apparatus of analog television signals where analog television signals can be received by digital processing and more particularly to receiving method and apparatus suitable for being used in a television receiver where, for example, signal proceeding is executed by digital form.

BACKGROUND ART

In an apparatus, for example, receiving analog television signals, analog processing as shown in FIG. 2 has been used in the prior art technology. In more detail with reference to FIG. 2, a high frequency signal supplied to an input terminal 21 is supplied to a first mixer circuit 22 and mixed with a first local oscillation signal from a first local oscillator 23 such that an intermediate frequency signal is formed. The intermediate frequency signal from the first mixer circuit 22 is supplied to a video carrier wave reproducer circuit 24 and a video demodulator circuit 25, and a demodulated video signal is derived at an output terminal 26.

At the same time the intermediate frequency signal from the first mixer circuit 22 is supplied to a second mixer circuit 27 and mixed with a video carrier wave from the video carrier wave reproducer circuit 24. In this way a modulated sound signal of stabilized carrier phase is formed and this modulated sound signal is supplied to a sound demodulator circuit 28 where a demodulated sound signal is derived at an output terminal 29. Accordingly video and sound signals included in the high frequency signal which is supplied to the input terminal 21 are demodulated and derived at the output terminals 26 and 29 respectively.

In view of the above apparatus, the video modulation system of the conventional analog television signals is a suppressed-carrier amplitude modulation system and a video carrier wave is reproduced in the video carrier wave reproducer circuit 24. In this case the signal based on such a suppressed-carrier amplitude modulation system has a tolerable-characteristic merit in phase noises and/or frequency changes, so that it is possible to derive demodulated video signals at the output terminal 26 after demodulating in the video demodulator circuit 25 by using the reproduced video carrier wave.

On the other hand the sound demodulating system of the analog television signals is generally a frequency modulation system which is easily influenced by the phase noises and/or frequency changes. However, in the above mentioned apparatus video carrier wave reproduced in the video carrier wave reproducer circuit 24 is supplied to the second mixer circuit 27 where the phase noises and/or frequency changes are cancelled by the phase noises and/or frequency changes included in that video carrier wave, so that a stabilized signal can be processed.

In this way a stabilized modulated sound signal in which phase noises and/or frequency changes are cancelled is derived from the second mixer circuit 27 and a signal from the second mixer circuit 27 is supplied to a sound demodulator circuit 28. Accordingly a demodulation is performed in the sound demodulator circuit 28 based on a stabilized modulated sound signal in which phase noises and/or frequency changes are cancelled, so that it becomes possible to derive a stabilized sound output signal at an output terminal 29.

On the other hand, recent years a digital type television broadcasting started and digital television receivers which receive digital television signals have begun spreading. In such digital television receivers the reception, the demodulation and the like are all performed by digital processing. However, it should be noted that analog type television broadcasting is also maintained now, so that it is demanded that analog television signals can also be received in such digital television receivers.

For this purpose the conventional digital television receivers are additionally provided with receiving means for receiving analog television signals by means of analog processing as shown in FIG. 2 independently to the receiving means for receiving digital television signals by means of digital processing. However, it should be noted that numbers of parts which constitute circuits increase by providing 2 channels of such receiving means, so that it causes a problem of higher cost and causes a bother for smaller-size's demand, and at the same time it causes a problem of power-consumption increase and the like.

The present invention has been made in view of such conditions, and problems to be solved are directed to that, in the conventional apparatus, receiving means for receiving analog television signals is based on analog processing such that receiving means for receiving digital television signals and for receiving analog television signals should be independently provided where numbers of parts which constitute circuits increase, so that it causes a problem of higher cost and causes a bother for smaller-size's demand, and at the same time it causes a problem of power-consumption increase and the like.

DISCLOSURE OF THE INVENTION

Claim 1 of the present invention is directed to receiving method of analog television signals which is characterized in that an intermediate frequency signal obtained by mixing a high frequency signal with a first local oscillation signal is supplied to a video carrier wave reproducer circuit for reproducing a video carrier wave, the intermediate frequency signal is supplied to a phase comparator for phase comparing with a signal from a variable frequency oscillator controlled based on the phase compared output, a variable component of the video carrier wave from the video carrier wave reproducer circuit is subtracted from the phase compared output so as to cancel the changes of the sound signal component.

In this way the analog television signals reception can be performed by digital processing and can be formed commonly within the digital television receiving means.

Additionally, according to claim 2 of the present invention the intermediate frequency signal is A/D converted and digital processing is conducted in the succeeding stages, so that signal processing can be performed by digital processing.

Further, claim 3 of the present invention is directed to receiving apparatus of analog television signals which comprises a video carrier wave reproducer circuit supplied with an intermediate frequency signal which is obtained by mixing a high frequency signal with a first local oscillation signal for reproducing a video carrier wave, a phase comparator supplied with the intermediate frequency signal for phase comparing with a signal from a variable frequency oscillator controlled based on the phase compared output, and an operation means for eliminating changes of a sound signal component by subtracting the variable component of the video carrier wave derived from the video carrier wave reproducer circuit from the phase compared output.

In this way the analog television signals reception can be performed by digital processing and can be formed commonly within the digital television receiving means.

Additionally, according to claim 4 of the present invention the intermediate frequency signal is A/D converted and digital processing is performed in succeeding stages, so that signal processing can be performed by digital processing.

BEST MODE FOR CARRYING OUT THE INVENTION

According to the present invention an intermediate frequency signal is supplied to a phase comparator and phase compared with a signal from a variable frequency oscillator which is controlled by the phase compared signal, and further, a variable component of a video carrier wave derived from a video carrier wave reproducer circuit is subtracted from the output derived from the phase comparator for eliminating the variation of the sound signal component whereby the receiving of analog television signals is performed by digital processing, so that it can be commonly constituted within the receiving means of digital television signals.

Figure 1:
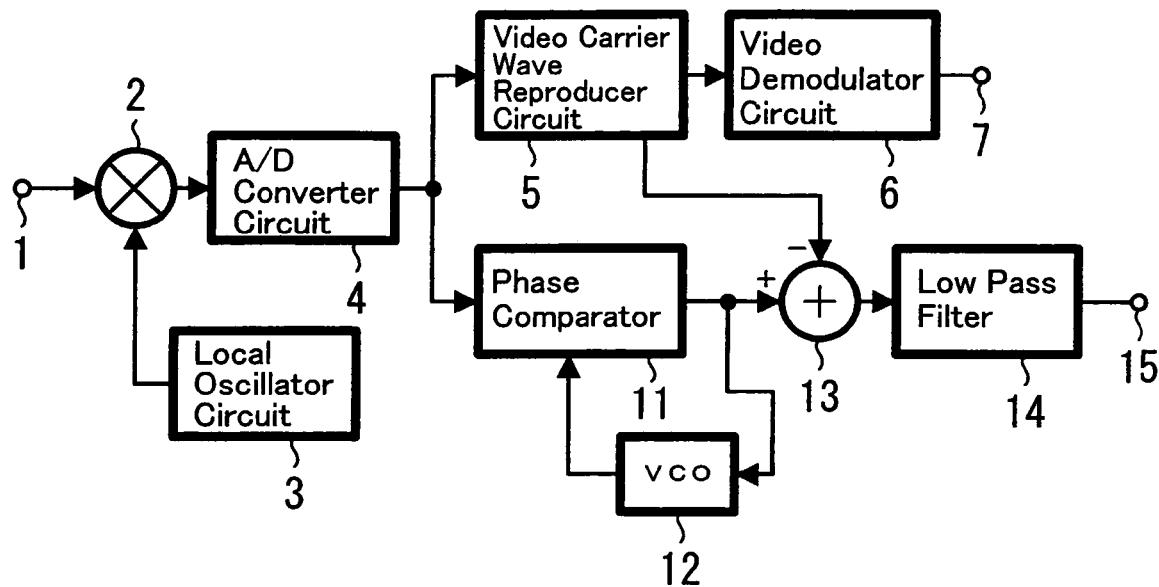
FIG. 1 is a block diagram showing a construction according to an exemplified embodiment of a main circuit portion of a television receiver to which receiving method and apparatus of analog television signals of the present invention is applied.
Figure 2:
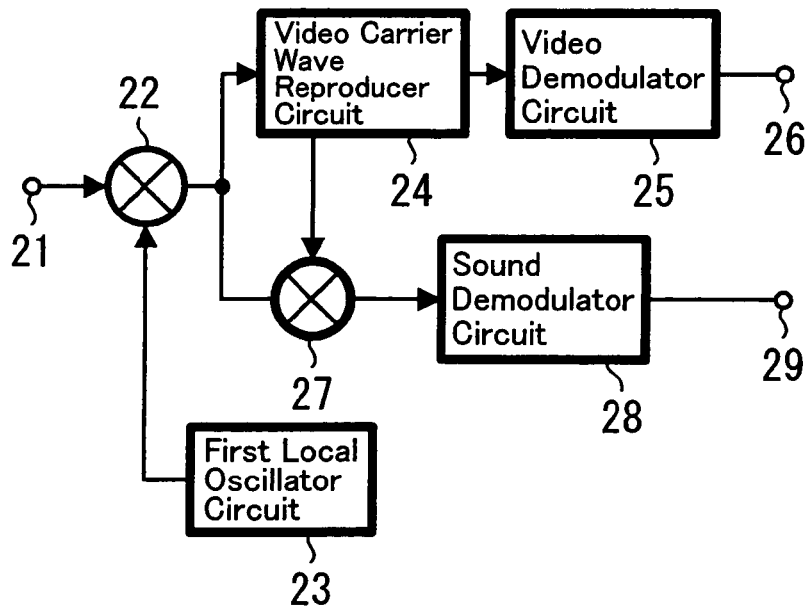
FIG. 2 is a block diagram to be used for explaining a conventional analog television receiver.

The Present invention will be explained hereinafter with reference to the drawings and FIG. 1 is a block diagram showing a construction according to an exemplified embodiment of a main circuit portion of a television receiver to which receiving method and apparatus of analog television signals of the present invention is applied.

In FIG. 1, a high frequency signal supplied to an input terminal 1 is supplied to a first mixer circuit 2 and mixed with a first local oscillation signal from a first local oscillator circuit 3, so that an intermediate frequency signal is formed. The intermediate frequency signal from the first mixer circuit 2 is supplied to an A/D converter circuit 4 and converted to a digital signal, for example, by sampling frequency of 27 MHz. Thereafter the converted digital signal is supplied to a video carrier wave reproducer circuit 5 and a video demodulator circuit 6 by digital processing and a demodulated video digital signal is obtained at an output terminal 7.

At the same time the digital signal from the A/D converter circuit 4 is supplied to a phase comparator circuit 11 and phase compared with an oscillation signal from a variable frequency oscillator (hereinafter simply designated as VCO) 12. Additionally this phase compared output is supplied to the VCO 12 such that the oscillation signal of the VCO 12 is varied based on the phase compared output. In this configuration the phase comparator circuit 11 is operated as a multiplier and an operation is conducted for converting a sound digital signal component included in the digital signal to a certain frequency.

This is to say, an intermediate-frequency video carrier wave and a digital signal including a sound carrier wave are derived from the A/D converter circuit 4. In this situation the reference oscillation frequency of the VCO 12 is selected, for example, as the sound carrier frequency such that a digital signal component near this sound carrier frequency-band is converted to, for example, a frequency near the base band and derived from the phase comparator 11. It should be noted that the derived digital signal here has an influence caused by phase noises and/or frequency changes.

Accordingly, the phase compared output of the phase comparator 11 is additionally supplied to an adder (operation means) 13 and the video carrier wave component reproduced by the above mentioned video carrier wave reproducer circuit 5 is subtracted therein. In this way a sound digital signal of stabilized carrier phase is formed. In more detail, the video carrier wave component reproduced by the video carrier wave reproducer circuit 5 includes phase noises and/or frequency changes similar to those included in the digital signal of the intermediate frequency signal and by subtracting the video carrier wave component, phase noises and/or frequency changes of the frequency converted digital signal will be cancelled, so that a stabilized sound digital signal can be obtained.

Consequently a stabilized sound digital signal where phase noises and/or frequency changes are eliminated by these phase comparator 11 and adder 13 is formed and similar processing is performed as the conventional second mixer circuit 27. Thereafter the sound digital signal which is stabilized in its carrier phase is supplied to a low pass filter 14 where signals other than audible band are eliminated or cut out and a demodulated sound digital signal is derived at an output terminal 15. In this way video and sound signals included in the high frequency signal supplied to the input terminal 1 are demodulated and derived at the output terminals 7 and 15 respectively.

In the above apparatus the processing in the phase comparator 11 to the low pass filter 14 is digital processing all the way and the receiving means of analog television signals is realized by digital processing. Accordingly it is possible to form analog television receiving means which is intimate with digital television receiving means, so that the circuit configuration can be made common both for digital television receiving means and analog television receiving means.

As mentioned above, in the exemplified embodiment an intermediate frequency signal is supplied to a phase comparator and phase compared with a signal from a variable frequency oscillator, and further a variable component of a video carrier wave from a video carrier wave reproducer circuit is subtracted from that phase compared output so as to cancel the changes of the sound signal component whereby an analog television signals receiving can be performed by digital processing and can be made common within a digital television receiving means.

As mentioned above, in a conventional apparatus analog processing is used for receiving analog television signals, such that digital television receiving means and analog television receiving means must be provided independently and numbers of parts which constitute circuits increase, so that it causes a problem of higher cost and causes a bother for smaller-size's demand, and at the same time it causes a problem of power-consumption increase and the like, while such problems are easily removed according to the present invention.

In this way, according to the above mentioned analog television receiving method an intermediate frequency signal obtained by mixing a high frequency signal with a first local oscillation signal is supplied to a video carrier wave reproducer circuit for reproducing a video carrier wave, the intermediate frequency signal is supplied to a phase comparator for phase comparing with a signal from a variable frequency oscillator controlled based on that phase compared output and at the same time the variable component of the video carrier wave from the video carrier wave reproducer circuit is subtracted from that phase compared output so as to cancel the changes of the sound signal component whereby analog television signals receiving can be performed by digital processing.

In another view according to the above mentioned analog television signals receiving apparatus, there are provided with a video carrier wave reproducer circuit supplied with an intermediate frequency signal which is obtained by mixing a high frequency signal with a first local oscillation signal for reproducing a video carrier wave, a phase comparator supplied with the intermediate frequency signal for phase comparing with a signal from a variable frequency oscillator controlled based on that phase compared output, and an operation circuit for eliminating changes of the sound signal component by subtracting the variable component of the video carrier wave derived from the video carrier wave reproducer circuit from that phase compared output, so that analog television signals receiving can be performed by digital processing.

It should be noted that the present invention is not limited to the exemplified embodiment mentioned above and various modifications can be applied without departing from the scope of the present invention.

The invention claimed is:

1. A method of receiving analog television signals having video and sound signals, comprising the steps of: mixing a high frequency signal of the received analog television signal with a local oscillation signal to produce an intermediate frequency signal, reproducing a video carrier wave from said intermediate frequency signal, phase comparing said intermediate frequency signal to a variable frequency signal to produce a phase compared output, controlling the variable frequency signal as a function of the phase compared output, and subtracting a component of the reproduced video carrier wave from said phase compared output so as to cancel changes of a sound signal component.

2. The method of claim 1, further comprising the steps of A/D converting the intermediate frequency signal, and digital processing the steps of video carrier wave reproduction, phase comparison and subtraction.

3. Receiving apparatus of analog television signals comprising: a video carrier wave reproducer circuit supplied with an intermediate frequency signal which is obtained by mixing a high frequency signal with a first local oscillation signal for reproducing a video carrier wave, a phase comparator supplied with said intermediate frequency signal for phase comparing with a signal from a variable frequency oscillator controlled based on the phase compared output, and an operation means for eliminating changes of a sound signal component by subtracting the variable component of the video carrier wave derived from said video carrier wave reproducer circuit from the phase compared output.

4. Receiving apparatus of analog television signals according to claim 3, wherein said intermediate frequency signal is A/D converted, and digital processing is preformed in the succeeding stages.

* * * * *